Aug. 4, 1936.  W. D. HAVENS ET AL  2,049,542
RAKE CLEANER ATTACHMENT
Filed June 13, 1935
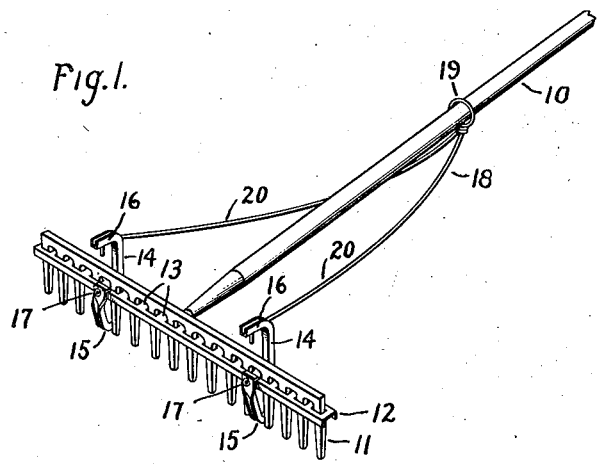
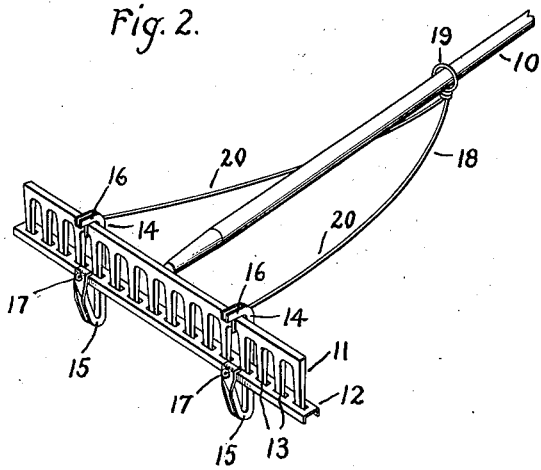
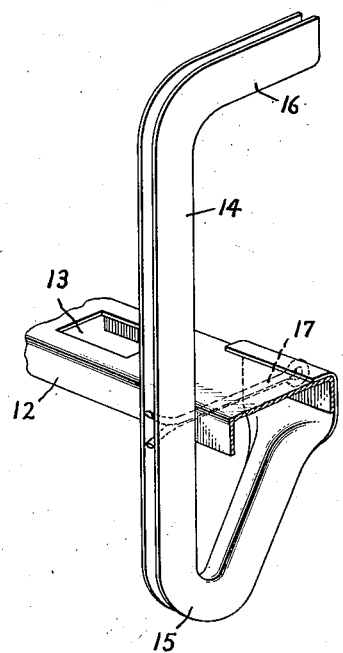
Inventors:
William D. Havens,
William A. Cryne,
by Arthur E. Prangley
Their Attorney Patented Aug. 4, 1936

2,049,542

UNITED STATES PATENT OFFICE 2,049,542

RAKE CLEANER ATTACHMENT

William D. Havens and William A. Cryne, Schenectady, N. Y.

Application June 13, 1935, Serial No. 26,396

4 Claims. (Cl. 55—146)

Our invention relates to a cleaner attachment for rakes.

An object of our invention is to provide an improved cleaner attachment for rakes which may be readily applied to the rake. A further object of our invention is to provide a rake cleaner attachment of simple construction consisting of a minimum number of parts which may be readily assembled together and will be of low cost of manufacture.

What we consider to be novel and our invention will be better understood by reference to the following specification when considered in connection with the accompanying drawing in which Fig. 1 is a perspective view of a rake with the cleaner attachment in operative position on the rake; Fig. 2 is a similar perspective view of a rake and the cleaner attachment with the cleaner in the inoperative position, and Fig. 3 is a perspective view on an enlarged scale, showing in detail a portion of the cleaner attachment.

Referring to the drawing, 10 indicates a rake handle on the end of which is provided the usual rake teeth 11. To remove any matter adhering to the teeth in the operation or use of the rake an unloader or cleaner bar 12 is provided. Unloader 12 is provided with openings 13 slightly larger than the shank of teeth 11 and corresponding in number to the number of teeth on the rake. Unloader 12 is formed of a U shaped channel member for rigidity to prevent it from twisting and bending and thus binding on the teeth. To move the unloader 12 to the operative position and to prevent it from falling away from the rake two combined foot and stop members 14 are provided. Members 14 are formed from channels with a depending V-shaped foot 15 and L shaped stop 16 integrally connected together. Members 14 are secured to unloader 12 by cotter pins 17. To move the unloader 12 from the operative to the inoperative position and thus remove any foreign matter collected on teeth 11, a spring 18 is provided with a loop 19 adapted to loosely fit on handle 10 and two arms 20. Arms 20 have hooked ends which fit in openings in stops 16 of members 14 and serve to connect spring 18 to unloader 12. The cleaner attachment is assembled to the rake by first placing the unloader 12 in position on the teeth 11 with members 14 secured to it by cotter pins 17. The spring 18 is next placed in position by passing loop 19 over handle 10 and inserting the ends of arms 20 in the openings in members 14. The whole cleaner assembly is thus secured in position on the rake. The cleaner is removed simply by disconnecting spring 18 from members 14 and tilting unloader 12 back to permit stop 16 to pass the teeth 11. The spring 18 is then slipped off handle 10. The securing of the spring 18 to the handle 10 merely by the provision of an integral loop 19 which loosely fits the handle greatly facilitates assembly of the cleaner on the rake and similarly makes it possible to quickly remove the cleaner when it isn't needed. When the arms 20 of spring 18 are connected to members 14 the loop 19 is held in position on handle 10 by the spring tension produced by the arms 20. In the operation of the cleaner as the rake is moved back and forward with the teeth 11 in engagement with the ground, the unloader 12 is moved to the operative position indicated in Fig. 1 by the engagement of the two feet 15 of members 14 with the ground. When it is desired to remove any foreign matter from teeth 11 the rake is merely lifted from the ground and the tension of spring 18 moves unloader 12 to the position indicated in Fig. 2. Further downward movement of unloader 12 is prevented by stops 16 of members 14 engaging the cross member of teeth 11. Obviously, any foreign matter is removed from teeth 11 in the passage of unloader 12 from the operative position of Fig. 1 to the inoperative position of Fig. 2.

From the foregoing it may be seen that a rake cleaner attachment is provided consisting of three parts of simple construction which may be readily located in position and secured to the rake and similarly removed from the rake when it is desired to use the rake without such attachment.

What we claim as new and desire to secure by Letters Patent of the United States, is:

1. A cleaner attachment for rake teeth comprising an unloader having openings for the teeth, a combined foot and stop member secured to said unloader, and an actuating spring having a loop adapted to pass freely over the rake handle and an arm integral with the loop connected to said member.

2. A cleaner attachment for rake teeth comprising an unloader having openings for the teeth, combined foot and stop members secured to said unloader, and a spring having a loop loosely fitting the handle of the rake and integral arms connected to said combined foot and stop members.

3. A cleaner attachment for rakes comprising an unloader having openings for the rake teeth, a foot secured to the unloader and adapted to move it to the operative position, a spring having a loop fitting the rake handle and integral arms connected to the unloader and adapted to move it to the inoperative position, and a stop secured to the unloader and serving to limit the movement of the unloader to the inoperative position.

4. A cleaner attachment for rakes comprising an unloader having openings for the rake teeth, a foot secured to the unloader and adapted to hold it in one position, a stop secured to the unloader and adapted to limit the movement of the unloader to a second position, and a spring having a loop fitting the rake handle and integral arms connected to the unloader and adapted to move the unloader from said one position to said second position whereby any foreign matter collected on the rake teeth is removed.

WILLIAM D. HAVENS.
WILLIAM A. CRYNE.